United States Patent Office 2,716,434
Patented Aug. 30, 1955

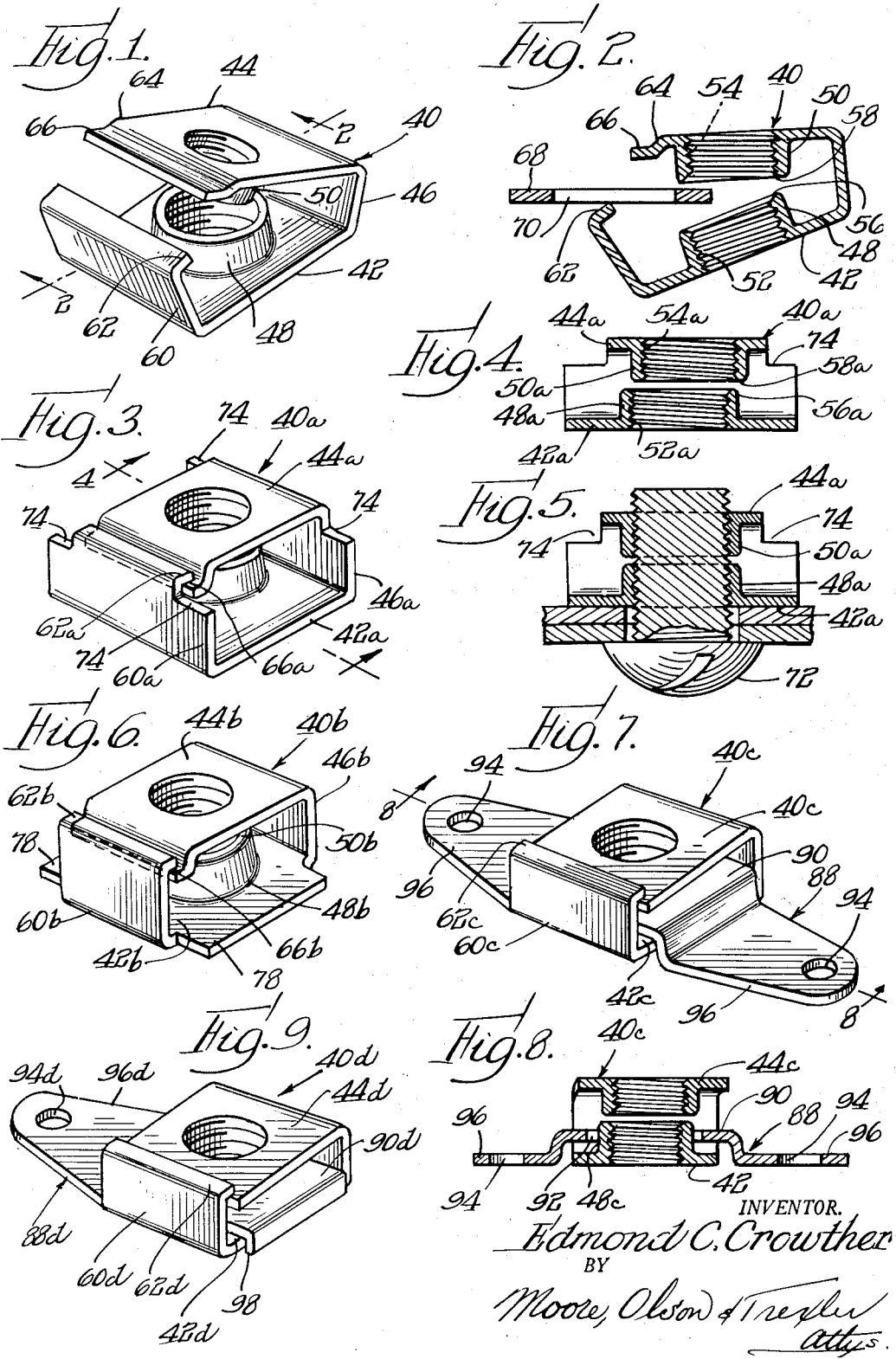

2,716,434

LOCK NUT AND RETAINER

Edmond C. Crowther, Chicago, Ill., assignor to Illinois Tool Works, Chicago, Ill., a corporation of Illinois Application June 6, 1952, Serial No. 292,176

2 Claims. (Cl. 151—41.76)

The present invention relates to lock nut and retainer, and more particularly to lock nuts of the type, wherein superimposed plate members, having threaded apertures, are self-locking when applied to a complementary screw element.

An object of the present invention is to provide a lock nut of the above type, which may be easily and cheaply manufactured, which may be easily assembled with a complementary screw element and which has very efficient locking characteristics.

A more specific object of this invention is to provide a lock nut of the above type, wherein the plates are integrally joined along adjacent margins, the plates are offset transversely of the axes of the apertures to materially increase the self-locking ability of the device, and means are provided for retaining the plates against axial displacement away from each other while they are being applied to a screw element, whereby easy application is assured.

Another object of this invention is to construct a lock nut of the above type from one piece of sheet material, whereby the device may be produced very economically.

Still another object of this invention is to construct a device of the above described type, so that the threads defining the interior wall of the apertures have a substantial length, whereby the strength of the present lock nut compares favorably with a one-piece nut, having a thickness equal to the over-all thickness of the present device.

Other objects and advantages of the present invention will be apparent from the following description and the drawings, wherein:

Fig. 1 is a perspective view, showing one embodiment of a lock nut, involving the present invention before it is assembled with a work piece;

Fig. 2 is a vertical cross section taken through line 2—2 in Fig. 1 and showing a lock nut in an intermediate stage of assembly with a work piece;

Fig. 3 is a perspective view, showing another embodiment of the present invention;

Fig. 4 is a vertical cross section taken through line 4—4 in Fig. 3;

Fig. 5 is similar to Fig. 4, but showing the lock nut assembled with a work piece and a complementary screw element;

Fig. 6 is similar to Fig. 3 and shows another embodiment of the present invention;

Fig. 7 is a perspective view, showing another embodiment of the present invention assembled with an anchorage member;

Fig. 8 is a vertical cross section taken through line 8—8 of Fig. 7;

Fig. 9 is a perspective view, showing a modified form of the device of Fig. 7.

Fig. 1 shows one embodiment of a lock nut, involving the present invention, which is generally designated by the numeral 40. The lock nut 40 is formed from a single strip of sheet maerial, such as metal. The lock nut is provided with a plate member 42 and a superimposed plate member 44, which plate members are integrally connected along adjacent margins by a side or hinge element 46. The plate members are extruded to form the centrally located projections or bosses 48 and 50. The bosses are formed with apertures which have the interior walls thereof defined by helical screw threads 52 and 54. The bosses 48 and 50 are preferably formed so that the length thereof will permit the screw threads 52 and 54 to have several convolutions. The screw threads, therefore, will be of substantial length and will have a strength which is substantially equal to the strength of a solid nut having threads of equal length. In order to make the device effectively self-locking, the hinge 46 is twisted about its vertical axis to displace the plates relative to each other transversely of the axes of their respective apertures. As a result of this step, the axes of the apertures are laterally offset from each other.

When a complementary screw element is threaded through the lock nut 40, the plate members 42 and 44 are forced into alignment against the resistance of the twisted side or hinge 46. The hinge 46 continues to urge the plate members to their original laterally offset positions, thus causing the screw threads 52 and 54 to tightly grip the screw element. The force with which the screw element is gripped may be adjusted by varying the amount of material in the hinge 46, as by cutting it away, as in Fig. 3, or in any other suitable manner. The apertures of the projections are provided with flared mouths, as at 56 and 58. These flared mouths tend to guide a screw element being inserted through one side of the nut into the threaded aperture of the projection extending from the opposite side of the nut. It has been found, however, that during the assembly of the screw element with these lock nuts, the screw element is not guided into the opposite threaded aperture, but rather, it engages the free edge of the projection and causes the plate members 42 and 44 to separate axially, or along the axes of their apertures. This axial separation often makes it difficult, if not impossible, to thread the screw element completely through the nut without first moving the plate members 42 and 44 into axial alignment by hand or by other suitable means. In order to overcome this difficulty, means is provided by the present invention to prevent such axial separation of the plate members 42 and 44. In the embodiment shown in Fig. 1, this means includes side wall 60, which terminates at its upper end in an inwardly directed hook or flange portion 62. The plate member 44 is stepped downwardly at 64, so that the hook portion 62 may engage over the marginal portion 66 of the plate member 44 without extending above the top surface of the plate member.

Fig. 6 shows an embodiment of the present invention, which is identical to that shown in Figs. 1 and 2, except that the lock nut 40–b is provided with extensions or wings 78 extending outwardly from the free edges of the plate 42–b. The wings 78 make the lock nut 40–b particularly adaptable for use in assembly with channel members.

Figs. 7 and 8 show the present invention as applied to a two-piece anchor nut. The nut 40–c is identical in all respects with the nut shown in Figs. 1 and 2, with the exception that the down-stepped marginal edge 66 is eliminated, thus making the top plate 44–c substantially flat. In this embodiment, the lock nut 40–c is provided with an anchor member 88, which has a raised central portion 90 adapted to fit over the plate 42–c. The mid portion 90 is provided with an aperture 92 adapted to receive the projection or boss 48–c. Apertures 94 are provided adjacent the wings 96 of the anchor member 88 for receiving any suitable fastening means, such as screws or rivets, not shown. As clearly shown in the drawings (see Figs. 7 and 8) the spacing between the adjacent free extremities of the projections or extrusions 48-c, 50-c is sufficiently less than the thickness of the anchor plate 88 to prevent unauthorized separation of the plate from the nut structure. The lock nut 40-d, shown in Fig. 9, is identical in all respects with the embodiments shown in Figs. 7 and 8. However, in this embodiment, the anchor member 88-d is provided with only one wing 96-d, while the other end terminates in a depending flange 98.

From the above descriptions, it is seen that the present invention has provided a lock nut, which may be easily and cheaply manufactured from sheet material, such as metal, and which may easily be adapted to a variety of uses. Moreover, a lock nut has been provided in which axial separation of the upper and lower plate members is prevented, thereby assuring quick and efficient assembly of a complementary screw element. In addition, it is seen that the means for preventing such axial separation is constructed in a manner so that the upper and lower plate members may be originally displaced transversely of the axes of the apertures and subsequently brought into alignment by the assembly of a complementary screw element, whereby an extremely effective locking nut is provided.

While several embodiments of the present invention have been shown and described herein, it is obvious that many structural changes may be made without departing from the spirit and scope of the following claims.

I claim:

1. A lock nut made from a strip of sheet material including a pair of superposed plate members having laterally offset annular extrusions extending toward each other from said plate members, the inner extremities of said extrusions being spaced slightly from each other, said extrusions having thread convolutions of substantially peripheral extent therein, resilient hinge means connecting adjacent marginal edges of said plate members whereby said plate members may be laterally displaced relative to each other to align said threaded extrusions for insertion of a complementary threaded fastener element, said superposed plate members being disposed in predetermined axial spaced relation to insure continuity of thread helixes in said extrusions, integral tab means extending from one of said plate members having a portion thereof overlying an outwardly facing surface of the other plate member for maintaining the predetermined maximum axial spaced relationship while allowing lateral relative movement between said plate members, and an apertured anchoring plate member telescopically associated with said extrusions, the space between the free opposed extremities of said extrusions being sufficiently less than the thickness of the anchoring plate to prevent unauthorized separation of said plate from the other sheet metal nut structure.

2. A lock nut as set forth in claim 1, wherein the extrusion accommodating aperture in the anchoring plate member is sufficiently large to provide clearance between the outer periphery of a complementary extrusion and the anchoring member whereby to permit limited lateral displacement of the telescopically associated parts.

References Cited in the file of this patent

UNITED STATES PATENTS

| | | |
|---|---|---|
| 2,291,290 | Tinnerman | July 28, 1942 |
| 2,318,708 | Parr | May 11, 1943 |
| 2,405,925 | Poupitch | Aug. 13, 1946 |
| 2,443,066 | Breedlove | June 8, 1948 |
| 2,684,704 | Crowther | July 27, 1954 |